R. ETTERSHANK.
FISHING BAIT.
APPLICATION FILED JUNE 17, 1918.
1,303,467.                              Patented May 13, 1919.
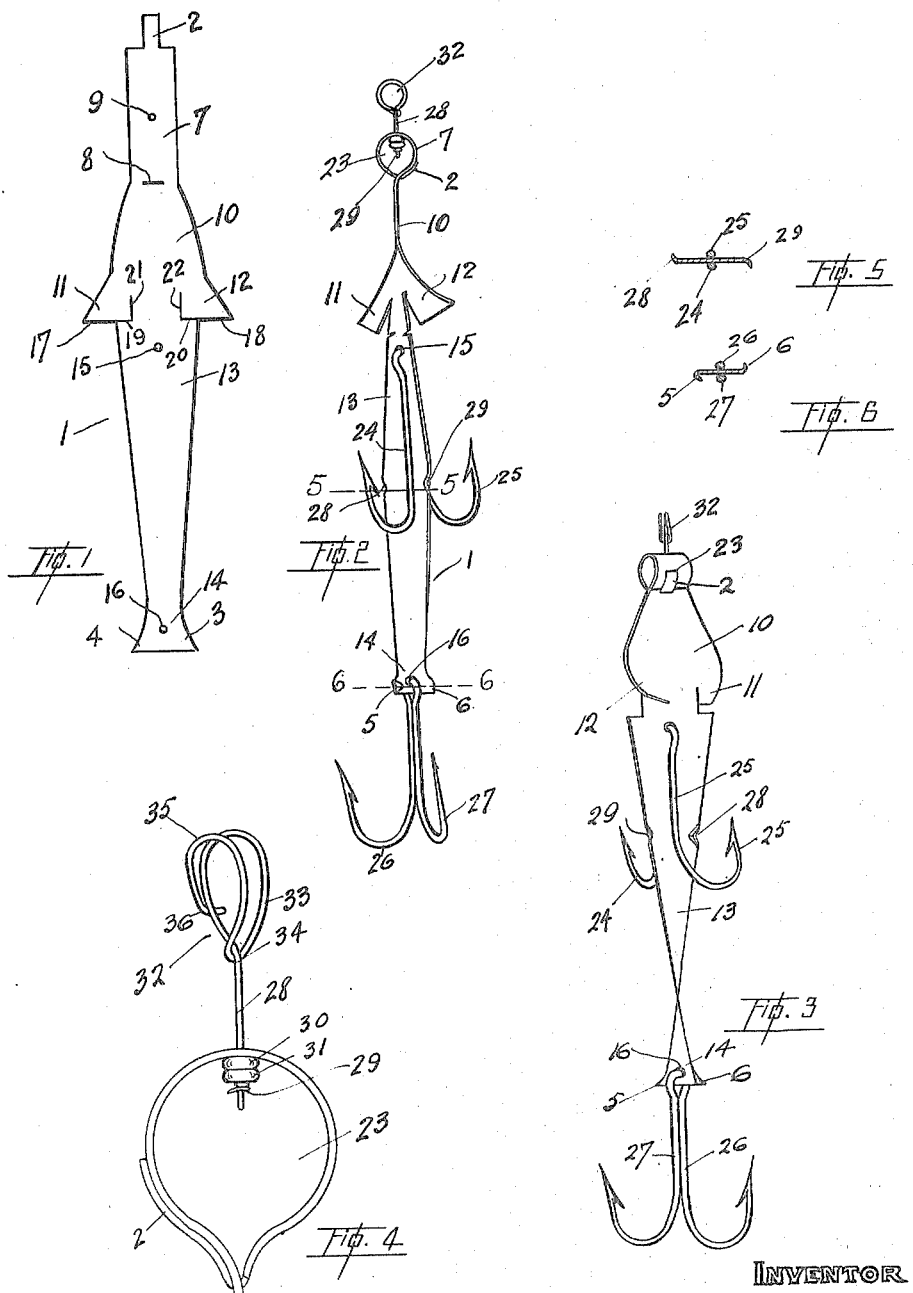
INVENTOR
Roy Ettershank.
BY
Fetherstonhaugh & Co.
ATTYS.

UNITED STATES PATENT OFFICE.

ROY ETTERSHANK, OF VANCOUVER, BRITISH COLUMBIA, CANADA.

FISHING-BAIT.

1,303,467.  Specification of Letters Patent.  Patented May 13, 1919.

Application filed June 17, 1918. Serial No. 240,373.

*To all whom it may concern:*

Be it known that I, ROY ETTERSHANK, a subject of the King of Great Britain, and a resident of the city of Vancouver, in the Province of British Columbia, Canada, have invented certain new and useful Improvements in Fishing-Baits, of which the following is a specification.

My invention relates to improvements in fishing baits, and the object of my invention is to devise a life-like and practical bait for trolling which is of the simplest construction and capable of being formed out of one piece of metal, thereby enabling it to be manufactured and sold at a very low cost and from which highly efficient results are obtainable.

I attain this object by the construction illustrated in the accompanying drawings in which—

Figure 1 is a view of the blank from which the bait is formed.

Fig. 2 is a perspective view of the bait.

Fig. 3 is a face view.

Fig. 4 is an enlarged view of the eye.

Fig. 5 is a sectional view taken on the line 5—5 of Fig. 2.

Fig. 6 is a sectional view taken on the line 6—6 of Fig. 2.

Similar figures of reference indicate similar parts throughout the several views.

1 indicates the blank out of which the bait is constructed and which may consist of any suitable material, such as stout polished tin. One end of the blank is reduced in width to form a tongue 2 while its opposite end is flared outwardly as at 3 and 4, the points of these flared ends being turned oppositely to each other to form curved projections 5 and 6 outstanding from the opposite sides of the blank, as shown in Fig. 3. From the tongue portion 2 for about one-third of its length the blank has parallel edges and in this parallel portion 7 a slit 8 and a hole 9 are formed, the slit being positioned opposite the termination of the parallel sides of the portion 7 and the hole 9 being at the midlength of the portion 7. The blank then widens out to form the upper part of the body of the bait, the wide portion 10 being substantially equal to the length of the parallel portion 7 and its edges being curved for a part of their length and terminating in angular projections 11 and 12 extending outwardly from the edges of the blank, from which projecting portions the remainder of the blank extends to form the lower part of the body 13 and the tail 14 of the bait, in which parts 13 and 14 are provided the hook-receiving holes 15 and 16 respectively. The bases 17 and 18 of the angular projections are extended inwardly by cutting slits 19 and 20 in the blank, these slits being continued at right angles by cutting toward the tongue end to form other slits 21 and 22, as shown in Fig. 1.

To form the bait out of the blank constructed as above the parallel portion 7 is bent around to constitute an eye 23; the tongue 2 being passed through the slit 8 and clenched and the projections 11 and 12 are bent outwardly on opposite sides to form fins as shown in Figs. 2 and 3. Unbrazed double hooks 24—25 and 26—27 are passed through the holes 15 and 16 the inherent spring of which hooks holds them closely to the blank on both sides and to prevent the hooks 24—25 from swinging out from the bait indentations 28 and 29 are formed in the opposite sides of the blank, as shown in Figs. 2, 3 and 5, the hooks 26—27 being similarly retained against too free outwardly swinging movement by the curved projections 5 and 6 hereinbefore mentioned.

In order to provide for the attachment of the bait to a line, a wire 28 is passed through the hole 9 either before or after the eye 23 is formed, being doubled over on itself as at 29 to form a head and provided with two beads 30 and 31 of glass or other suitable material, which insure a free swivel action of the wire 28. The free end of the wire is formed as a loop indicated generally by the numeral 32, which is constructed as shown in Fig. 4, that is, by first forming the free end of the wire into a loop 33, passing the free end under the shank 34 and forming it into another loop 35 alongside the loop 33 and then bending the free end to lie adjacent the outside of the loop 33 as shown at 36 in Fig. 5, so as to prevent the fouling of the leader by the end of the wire as it might do if the same were left straight.

The life-like action of the bait when being drawn through the water is obtained by imparting an even continuous twist through an angle of 90° to the blank from end to end of the same so that the longitudinal axis of the eye 23 will be at right angles to the transverse axis of the tail end. The bait is varnished with shellac or the like so as to preserve the bright polish of the tin and to prevent rusting.

From the foregoing it will be seen that I have devised a fishing bait which is simple and practical and capable of being manufactured and sold at a very low cost.

What I claim as my invention is:

1. A fishing bait having the body thereof formed from a metal blank the intermediate portion of which is of greater width than the head and tail ends and is provided with angular projecting portions outstanding from its opposite edges and free of the body on all sides but one, the said tail end extending centrally from the intermediate portion and tapering inwardly toward its free end, the said head end being adapted to be formed into a line attaching means.

2. A fishing bait having the body thereof formed from a metal blank the intermediate portion of which is of greater width than the head and tail ends and is provided with angular projecting portions outstanding from its opposite edges and free of the body on all sides but one, the said tail end extending centrally from the base of the intermediate portion and tapering inwardly toward and flaring outwardly at its free end, the points of the flared end being turned outwardly oppositely to each other, the said head end terminating in a reduced portion and provided with an aperture at its midlength and a slit opposite its point of extension from the intermediate portion.

3. A fishing bait having the body thereof formed from a metal blank the intermediate portion of which is of greater width than the head and tail ends and is provided with angular projecting portions outstanding from its opposite edges and free of the body on all sides but one, the said tail end extending centrally from the intermediate portion and tapering inwardly toward and flaring outwardly at its free end and having oppositely and outwardly facing indentations formed in its edges intermediate its length and the points of its flared end turned outwardly oppositely to each other, the said head end terminating in a reduced portion and being provided with an aperture at midlength and a transverse slit opposite its point of extension from the intermediate portion.

4. A fishing bait comprising a spirally twisted body formed from a metal blank the intermediate portion of which is of greater width than the head and tail ends and is provided with angular projecting portions outstanding from its opposite edges and twisted oppositely to each other out of the plane of the body, the said tail end extending centrally from and provided with an aperture adjacent to the intermediate portion and being flared outwardly at its free end and provided with an aperture therethrough, the said head end extending centrally from the upper end of the intermediate portion terminating in a tongue member and being turned over to form an eye, the head end being provided with a slit through which said tongue passes to maintain the eye formation, and unbrazed double hooks sprung through the apertures in the said tail end.

5. A fishing bait comprising a spirally twisted body formed from a metal blank the intermediate portion of which is of greater width than the head and tail ends and is provided with angular projecting portions outstanding from its opposite edges and twisted oppositely to each other out of the plane of the body, the said tail end extending centrally from and provided with an aperture adjacent the intermediate portion, and being flared outwardly at its free end and provided with an aperture therethrough, the said head end extending centrally from the upper end of the intermediate portion terminating in a tongue member and being turned over to form an eye, the head end being provided with a slit through which said tongue passes to maintain the eye formation, unbrazed double hooks sprung through the apertures in the said tail end, and projections formed on the tail end intermediate its length and at its flared end respectively forming stops adapted to limit the lateral swing of the said hooks.

6. A fishing bait comprising a twisted body formed from a metal blank the intermediate portion of which is of greater width than the head and tail ends and provided with angular projections outstanding from its opposite edges twisted oppositely to each other out of the plane of the body, its head end being turned over on itself to form an eye and its tail end being provided with apertures adjacent the intermediate portion and its extremity respectively, and unbrazed double hooks sprung through said apertures to lie one on each side of the body.

7. A fishing bait comprising a twisted body formed from a metal blank the intermediate portion of which is of greater width than the head and tail ends and provided with angular projections outstanding from its opposite edges twisted oppositely to each other out of the plane of the body, its head end being turned over on itself to form an eye and its tail end being provided with apertures adjacent the intermediate portion and its extremity respectively, unbrazed double hooks sprung through said apertures to lie one on each side of the body, and stop members formed on the body adapted to limit the lateral swing of the said hooks.

8. A fishing bait comprising a spirally twisted body formed from a metal blank the intermediate portion of which is provided with angular projections outstanding from its opposite edges twisted oppositely to each other out of the plane of the body, the head portion being parallel and provided at its midlength with an aperture and terminating in a tongue member, said head end being turned over to form an eye and having a slit through which said tongue passes to be clenched to maintain the eye formation, a wire passed through said aperture provided with a bead or beads within the eye and doubled over on itself to form a bead-retaining head, the upper end of said wire being formed into a double loop the free end of which is turned inwardly, a tail portion extending from the intermediate portion provided with apertures adjacent the same and the tail end extremity, and unbrazed double hooks sprung through the said apertures to lie one on each side of the body.

Dated at Vancouver, B. C., this 4th day of June, 1918.

ROY ETTERSHANK.